United States Patent
Shetty

(10) Patent No.: US 9,118,657 B1
(45) Date of Patent: Aug. 25, 2015

(54) EXTENDING SECURE SINGLE SIGN ON TO LEGACY APPLICATIONS

(71) Applicant: Sachin Shekar Shetty, Mumbai (IN)

(72) Inventor: Sachin Shekar Shetty, Mumbai (IN)

(73) Assignee: Avior, Inc., San Ramon, CA (US)

( * ) Notice: Subject to any disclaimer, the term of this patent is extended or adjusted under 35 U.S.C. 154(b) by 0 days.

(21) Appl. No.: 14/160,553

(22) Filed: Jan. 22, 2014

Related U.S. Application Data

(63) Continuation-in-part of application No. 13/048,765, filed on Mar. 15, 2011, now abandoned.

(51) Int. Cl.
*H04L 29/06* (2006.01)
*G06F 21/41* (2013.01)

(52) U.S. Cl.
CPC ............ *H04L 63/0815* (2013.01); *G06F 21/41* (2013.01)

(58) Field of Classification Search
CPC ............................ H04L 63/0815; G06F 21/41
USPC ............................................................ 726/8
See application file for complete search history.

(56) References Cited

U.S. PATENT DOCUMENTS

| | | | |
|---|---|---|---|
| 8,707,409 B2* | 4/2014 | Shah et al. ........................ | 726/8 |
| 2004/0199795 A1* | 10/2004 | Grewal et al. ................ | 713/202 |
| 2005/0262357 A1* | 11/2005 | Araujo et al. ................ | 713/182 |
| 2007/0044144 A1* | 2/2007 | Knouse et al. .................... | 726/8 |
| 2007/0234408 A1* | 10/2007 | Burch et al. ..................... | 726/6 |

* cited by examiner

*Primary Examiner* — Hadi Armouche
*Assistant Examiner* — Bryan Wright
(74) *Attorney, Agent, or Firm* — Brill Law Office; Jeffrey Brill

(57) ABSTRACT

A secure single sign on is extended to a legacy web application that does not support the specific user authentication technique being used, such as SAML or OAuth. A proxy intercepts a request by a client computer to access the legacy application, and forwards the intercepted request to a single sign on identity provider. The identity provider authenticates the user, using the specific authentication technique not supported by the legacy application, and provides an indication of success to the proxy. The proxy transmits a user id and master password wrapped in an HTTP request to the legacy web application, which authenticates the request, creates a session and provides corresponding cookies to the proxy. The proxy forwards the cookies to the client, which utilizes them to continue the session with the legacy application.

20 Claims, 3 Drawing Sheets

EXTENDING SECURE SINGLE SIGN ON TO LEGACY APPLICATIONS

PRIORITY CLAIM

This patent application is a Continuation-In-Part of patent application Ser. No. 13/048,765, filed on Mar. 15, 2011, titled "Extending User Domain Level Authentication to Served Web-based Applications" (the "Parent Application"), which in turn claims the benefit of provisional application Ser. No. 61/314,043, titled "Thin Single Sign On," filed on Mar. 15, 2010. The Parent Application and the Provisional Application are both hereby incorporated by reference in their entireties.

TECHNICAL FIELD

This invention pertains generally to authentication of users for web applications, and more specifically to extending secure single sign on to legacy web applications that do not support contemporary user authentication techniques such as SAML or OAuth.

BACKGROUND

Users typically utilize many different online applications (e.g., hosted applications), each of which typically requires the user to sign on separately. For example, the ORACLE Corporation provides many different online applications such as ORACLE Financials, ORACLE HRMS, ORACLE Projects, ORACLE CRM, ORACLE PO, ORACLE Office, ORACLE Media Server, ORACLE ConText, etc. A user of some or all of these ORACLE application might additionally use online applications from other companies, such as, for example, SEIBEL, MICROSOFT, etc. The same user might additionally use one or more "home grown" or customized enterprise level applications.

Signing on to multiple applications separately is burdensome to the user, as the user must memorize and enter credentials to sign on to each application. Signing on to multiple applications separately also creates security vulnerabilities, as the credentials must be maintained by the user, who might not manage them as per proper security protocol (e.g., the user might share them, write them down, etc). Additionally, each time sign on credentials are submitted to an online application, there is a risk that the credentials could be intercepted by a malicious third party or otherwise compromised. Some issues of this nature can be addressed by single sign on (SSO) methodologies, some examples of which are described in the Parent and Provisional Applications.

Contemporary SSO techniques utilize secure identity providers. An identity provider, sometimes called an identity service provider or identity assertion provider, is an online service or website that authenticates users by means of security tokens (sometimes called identity tokens, authentication tokens or software tokens). In some cases, a service provider also operates as an identity provider. Typically, robust industry standard authentication technologies such as Security Assertion Markup Language ("SAML") and OAuth are used in this context. However, there are a lot of installations of legacy applications such as ORACLE Application 11i that do not support SSO integration via SAML or OAuth. Conventionally, integrators and developers have been forced to either make non-supported customizations to such applications, or procure commercial solutions other than the current industry standards (e.g., SAML and OAuth) to work with the legacy applications.

It would be desirable to address these issues.

SUMMARY

SSO is implemented on top of legacy web applications, in a secure manner, without modifying the legacy applications. In one embodiment, an SSO proxy is provided for a legacy web application like ORACLE 11i. The proxy intercepts login requests, and enforces the SAML, OAuth or other secure SSO authentication. After validation, a secure SSO session is established for the legacy application that does not itself support the authentication standard (e.g., SAML or OAuth). This is achieved without modifying the legacy application itself.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that other embodiments of the structures and methods illustrated herein may be employed without departing from the described principles.

DETAILED DESCRIPTION

Figure 1:
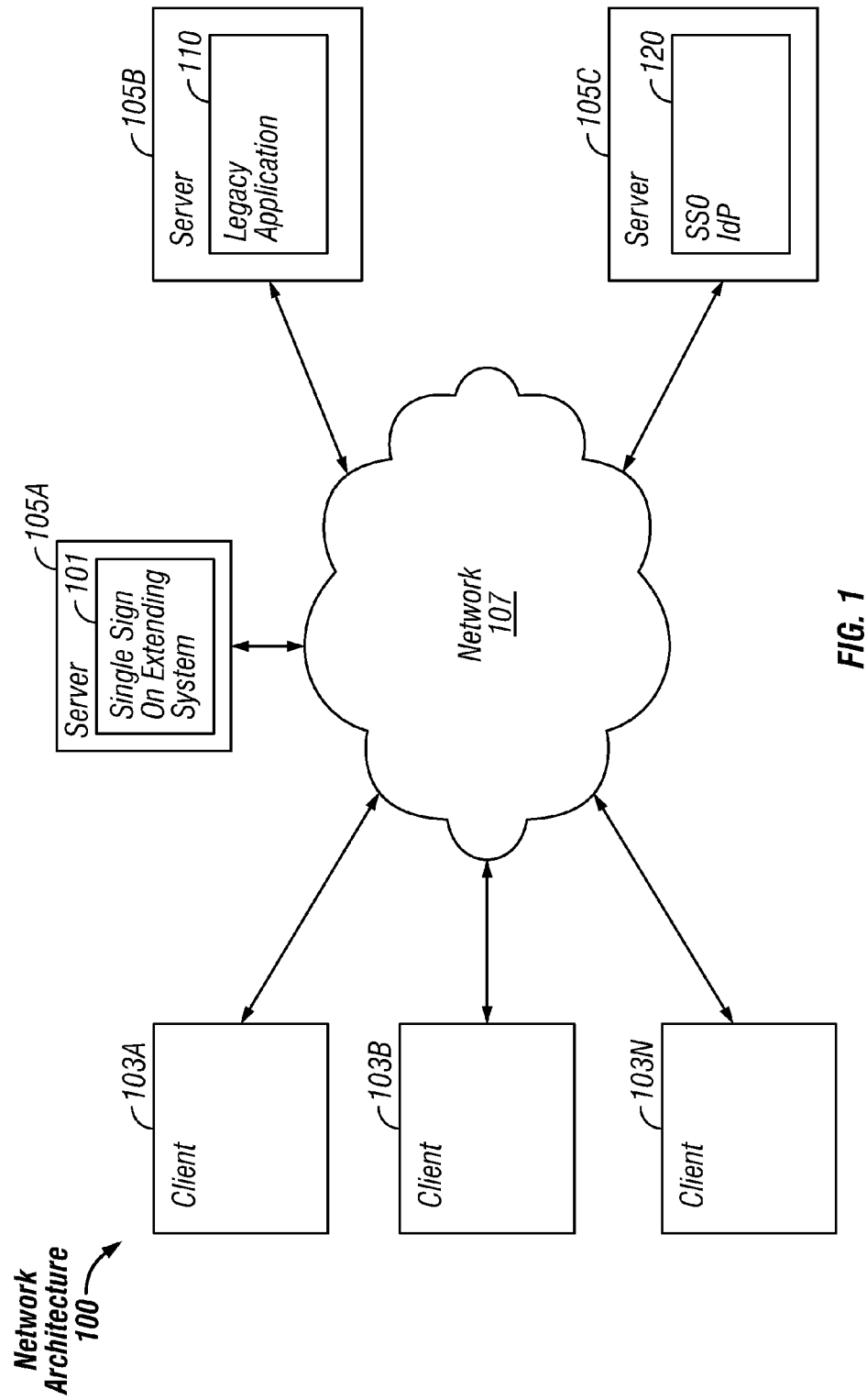
FIG. 1 is a block diagram of an exemplary network architecture in which a single sign on extending system can be implemented, according to some embodiments.

FIG. 1 is a block diagram illustrating an exemplary network architecture 100 in which a single sign on extending system 101 can be implemented. The illustrated network architecture 100 comprises multiple clients 103A, 103B and 103N, as well as multiple servers 105A, 105B and 105N. In FIG. 1, the single sign on extending system 101 is illustrated as residing on server 105A. FIG. 1 also illustrates a legacy application 110 residing on separate server 105B, and an SSO identity provider (IdP) 120 running on separate server 105N. It is to be understood that this is an example only, and in various embodiments various functionalities of these components can be instantiated on a client 103, a server 105 or otherwise distributed between multiple clients 103 and/or servers 105. The functionalities of the single sign on extending system 101, legacy application 110 and SSO IdP 120 are described below greater detail in conjunction with FIG. 3.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown in FIG. 1).

Although FIG. 1 illustrates three clients and three servers as an example, in practice many more (or fewer) clients 103 and/or servers 105 can be deployed. In one embodiment, the network 107 is in the form of the Internet. Other networks 107 or network-based environments can be used in other embodiments.

Figure 2:
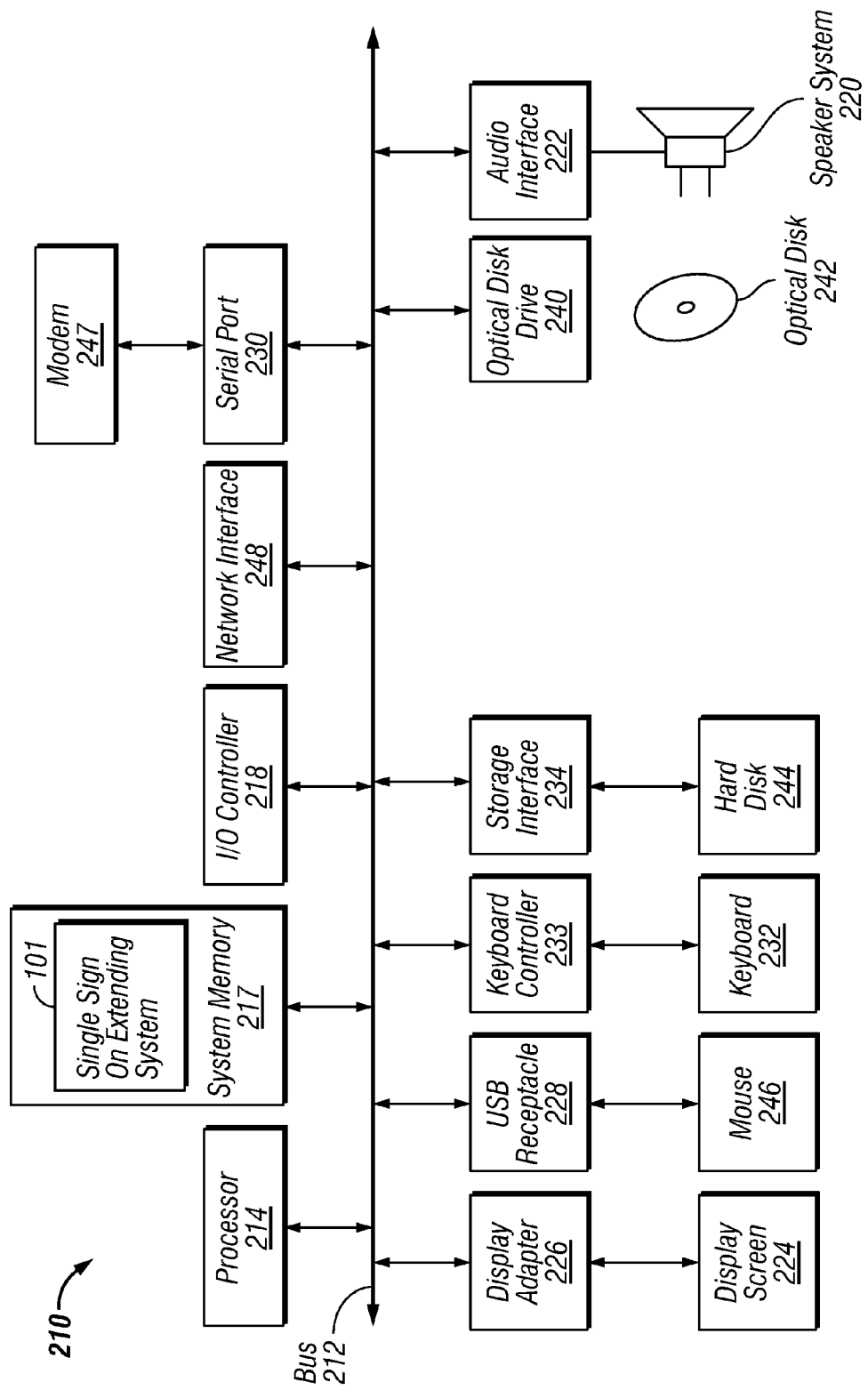
FIG. 2 is a block diagram of an exemplary computer system suitable for implementing a single sign on extending system, according to some embodiments.

FIG. 2 is a block diagram of a computer system 210 suitable for implementing a single sign on extending system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/ or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded or streamed into system memory 217 from a remote location (i.e., a remotely located computer system 210), for example via the network interface 248 or modem 247. In FIG. 2, the single sign on extending system 101 is illustrated as residing in system memory 217. The workings of the single sign on extending system 101 are explained in greater detail below in conjunction with other figures.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless. In one embodiment, enterprise applications are streamed over the Internet.

FIG. 2 illustrates the single sign on extending system 101, residing in the system memory 217 of a computer system 210 according to some embodiments. It is to be understood that although the single sign on extending system 101 is illustrated in FIG. 2 as a single entity, the illustrated single sign on extending system 101 represents a collection of functionalities, which can be instantiated as a single or multiple modules as desired. It is to be understood that the single sign on extending system 101 and modules thereof can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the single sign on extending system 101 can be stored on computer-readable storage media. Any form of tangible computer readable storage medium can be used in this context, such as non-transitory, magnetic or optical storage media. As used herein, the term "computer readable storage medium" does not mean an electrical signal separate from an underlying physical medium.

Figure 3:
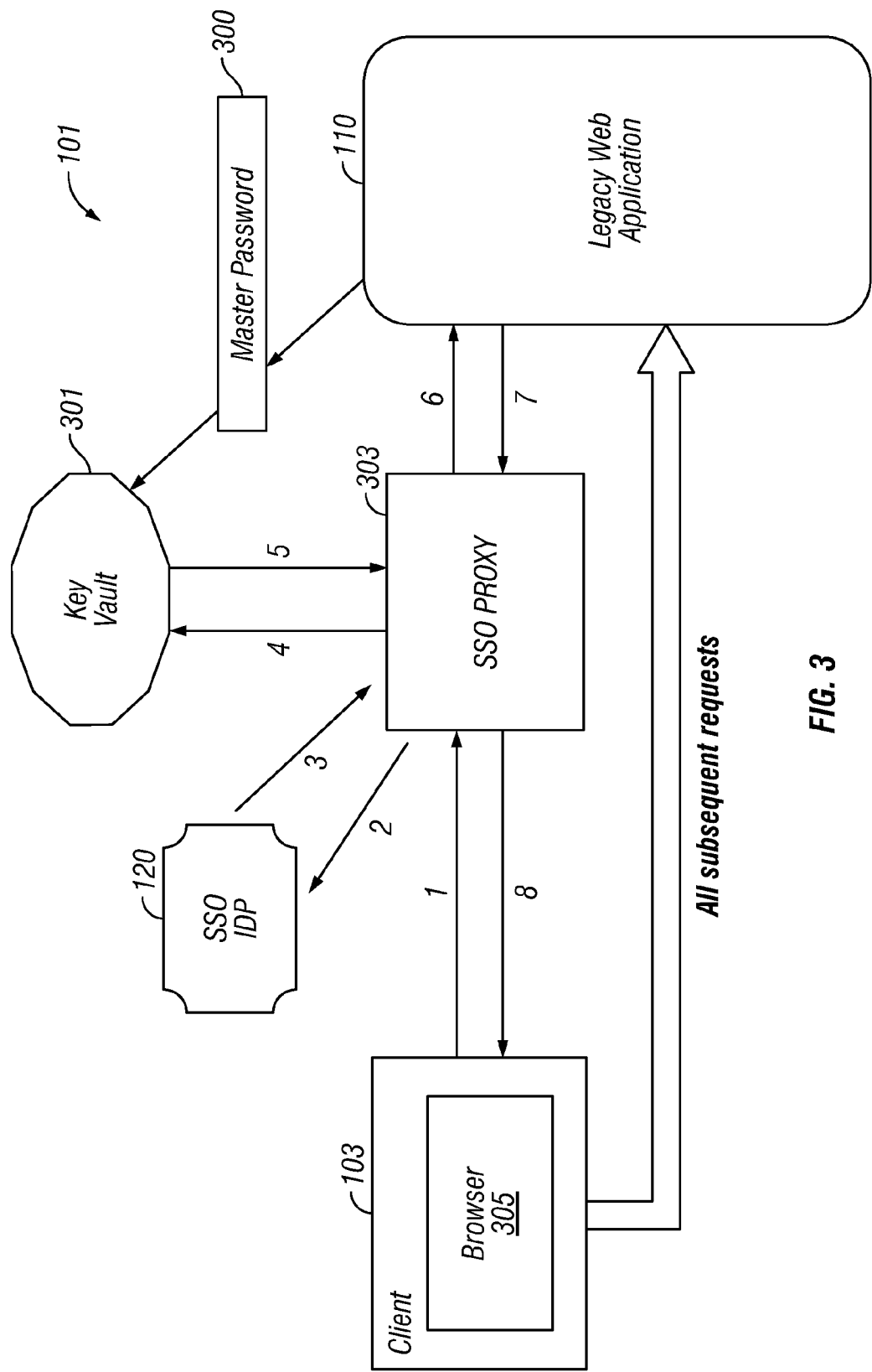
FIG. 3 is a block diagram illustrating operation of a single sign on extending system, according to some embodiments.

One detailed embodiment of the single sign on extending system 101 is shown in FIG. 3. In FIG. 3, the functionality of the single sign on extending system 101 is distributed between an SSO proxy 303, an SSO IdP 120, a key vault 301 and a legacy application 110. Although the SSO proxy 303 is illustrated as a standalone entity, the SSO proxy can be implemented as an Apache Reverse proxy or a Java Servlet deployed in the same container as the legacy application 110.

In order to prepare the legacy application 110 for SSO using an otherwise unsupported SSO IdP 120 such as SAML or OAuth, a master password 300 is selected that is very hard to guess. For example, special characters can be added to the master password 300 that cannot be typed on the keyboard using their Unicode values. The master password 300 is stored in a secure key vault 301 within the enterprise. The key vault 301 can be instantiated in the form of any secure storage mechanism, in which the password 300 can be stored securely. All user passwords for the legacy application 110 are updated to the secure master password 300 stored in the key vault 301. The SSO proxy 303 is configured to be able to connect to the key vault 301 and access the master password 300. Once these preliminary preparatory steps have occurred, the following flow of information can be utilized.

A user operating a client computer 103 attempts to access (step 1) the legacy application 110, for example by clicking on a link (e.g., an SSO enabled URL) for the legacy application, using a web browser 305. The access attempt is intercepted (step 2) by the SSO proxy 303, which examines the corresponding HTTP request, and forwards (step 2) this request to the SSO IdP 120. The SSO IdP 120 securely establishes the identity of the user by using SAML, OAuth or any other secure SSO identity establishment technique. The SSO IdP 120 then responds to the proxy 303 with Success (step 3), indicating that it has securely authenticated the user.

The SSO proxy 303 requests (step 4) the master password 300 for the legacy application 110 from the key vault 301, providing its own credentials. The key vault 301 supplies (step 5) the master password 300 to the SSO proxy 303. After the SSO authentication is completed, including the secure application of any authentication policies as desired, the SSO proxy 303 creates an http (or other protocol) connection to the legacy application 110.

The SSO proxy 303 uses this connection to relay (step 6) the username (as gleaned from the incoming request to access the legacy application 110) and the master password 300 (obtained from the key vault 301) to the legacy application 110, in the format the legacy application expects. In other words, the SSO proxy 303 sends the username and master password 300 to the legacy application 110, wrapped in an http request in a form that the legacy app understands.

The legacy application 110 authenticates the request, creates a user session, and sends back cookies that relate to management of the session (step 7). The SSO proxy 303 receives the cookies sent by legacy application 110, and sends them (step 8) to the user's browser 305 on the client 103.

At this point, a session is established between the user and the legacy application 110, so the SSO proxy 303 does not intercept additional transmissions between the browser 305 on the client 103 and the legacy application 110. Instead, the browser 305 now communicates directly with the legacy application 100. For all subsequent requests, the browser 305 sends the cookies back to the legacy application 110 as per standard HTTP protocol. Since the cookies are valid, the user session continues.

Note that by deploying an intelligent SSO proxy 303 between a client level browser 305 and legacy web application 110, a secure SSO session is established for a legacy application 110 which does not itself support SAML, OAuth or whatever secure SSO identity authentication technique is being used. No modifications are made to the legacy application 110 itself, and thus the license agreement from the legacy application vendor is not violated, and the vendor still supports the install of the legacy application 110.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer method for extending secure single sign on to a legacy web application that does not support a specific single sign on user authentication technique, the method comprising:
    intercepting, by a single sign on proxy, a request by a client computer to access the legacy web application, wherein the legacy web application does not support the specific single sign on user authentication technique;
    forwarding the intercepted request to a single sign on identity provider, by the single sign on proxy;
    authenticating the user of client computer using the specific single sign on user authentication technique not supported by the legacy web application, by single sign on identity provider;
    providing an indication to the single sign on proxy that the authentication using the specific single sign on user authentication technique not supported by the legacy web application was successful, by the single sign on identity provider;
    obtaining a master password for the legacy web application from a key vault, by the single sign on proxy;
    obtaining an identifier of the user from the intercepted request, by the single sign on proxy;
    transmitting the identifier of the user and the master password wrapped in an HTTP request to the legacy web application, by the single sign on proxy;
    authenticating the HTTP request and creating a session, by the legacy web application;
    receiving cookies concerning management of the session from the legacy web application, by the single sign on proxy; and
    transmitting the received cookies to the client computer by the single sign on proxy, wherein the client computer utilizes the cookies to continue the session and communicate directly with the legacy web application, such that the single sign on proxy no longer intercepts additional transmissions between the client computer and the legacy application;
    wherein a secure single sign on session using the specific single sign on user authentication technique not supported by the legacy web application is established for the legacy web application, while maintaining integrity of the legacy web application and not violating a license agreement of the legacy web application.

2. The method of claim 1 further comprising:
    enforcing, by the single sign on proxy, the specific single sign on user authentication technique, while maintaining integrity of the legacy web application.

3. The method of claim 1 further comprising:
    establishing a secure single sign on session by the single sign on proxy for the legacy web application which does not support the specific single sign on user authentication technique, while maintaining integrity of the legacy web application.

4. The method of claim 1 wherein the single sign on proxy further comprises:
    a standalone entity communicatively coupled to the legacy web application.

5. The method of claim 1 wherein the single sign on proxy further comprises:
    an Apache Reverse proxy.

6. The method of claim 1 wherein the single sign on proxy further comprises:
    a Java Servlet deployed in a same container as the legacy web application.

7. The method of claim 1 wherein the master password further comprises:
    at least some characters that cannot be typed on a keyboard.

8. The method of claim 1 further comprising:
    updating all user passwords for the legacy web application to the master password.

9. The method of claim 1 wherein the specific single sign on user authentication technique not supported by the legacy web application further comprises:
    Security Assertion Markup Language.

10. The method of claim 1 wherein the specific single sign on user authentication technique not supported by the legacy web application further comprises:
    OAuth.

11. At least one non-transitory computer readable medium for extending secure single sign on to a legacy web application that does not support a specific single sign on user authentication technique, the at least one non-transitory computer readable medium storing computer executable instructions that, when loaded into computer memory and executed by at least one processor of at least one computing device, cause the at least one computing device to perform the following steps:

intercepting, by a single sign on proxy, a request by a client computer to access the legacy web application, wherein the legacy web application does not support the specific single sign on user authentication technique;

forwarding the intercepted request to a single sign on identity provider, by the single sign on proxy;

authenticating the user of client computer using the specific single sign on user authentication technique not supported by the legacy web application, by single sign on identity provider;

providing an indication to the single sign on proxy that the authentication using the specific single sign on user authentication technique not supported by the legacy web application was successful, by the single sign on identity provider;

obtaining a master password for the legacy web application from a key vault, by the single sign on proxy;

obtaining an identifier of the user from the intercepted request, by the single sign on proxy;

transmitting the identifier of the user and the master password wrapped in an HTTP request to the legacy web application, by the single sign on proxy;

authenticating the HTTP request and creating a session, by the legacy web application;

receiving cookies concerning management of the session from the legacy web application, by the single sign on proxy; and transmitting the received cookies to the client computer by the single sign on proxy, wherein the client computer utilizes the cookies to continue the session and communicate directly with the legacy web application, such that the single sign on proxy no longer intercepts additional transmissions between the client computer and the legacy application;

wherein a secure single sign on session using the specific single sign on user authentication technique not supported by the legacy web application is established for the legacy web application, while maintaining integrity of the legacy web application and not violating a license agreement of the legacy web application.

12. The at least one non-transitory computer readable medium of claim 11 further storing computer executable instructions for:

enforcing, by the single sign on proxy, the specific single sign on user authentication technique, while maintaining integrity of the legacy web application.

13. The at least one non-transitory computer readable medium of claim 11 further storing computer executable instructions for:

establishing a secure single sign on session by the single sign on proxy for the legacy web application which does not support the specific single sign on user authentication technique, while maintaining integrity of the legacy web application.

14. The at least one non-transitory computer readable medium of claim 11 wherein the single sign on proxy further comprises:

a standalone entity communicatively coupled to the legacy web application.

15. The at least one non-transitory computer readable medium of claim 11 wherein the single sign on proxy further comprises:

an Apache Reverse proxy.

16. The at least one non-transitory computer readable medium of claim 11 wherein the single sign on proxy further comprises:

a Java Servlet deployed in a same container as the legacy web application.

17. The at least one non-transitory computer readable medium of claim 11 wherein the master password further comprises:

at least some characters that cannot be typed on a keyboard.

18. The at least one non-transitory computer readable medium of claim 11 further storing program instructions for:

updating all user passwords for the legacy web application to the master password.

19. The at least one non-transitory computer readable medium of claim 11 wherein the specific single sign on user authentication technique not supported by the legacy web application further comprises:

Security Assertion Markup Language.

20. The at least one non-transitory computer readable medium of claim 11 wherein the specific single sign on user authentication technique not supported by the legacy web application further comprises:

OAuth.

* * * * *